United States Patent

Riesselmann

[11] Patent Number: 5,829,795
[45] Date of Patent: Nov. 3, 1998

[54] PRESS-FITTING DEVICE FOR CONNECTION OF A TUBE

[75] Inventor: Franz-Josef Riesselmann, Lohne, Germany

[73] Assignee: Hewing GmbH, Ochtrup, Germany

[21] Appl. No.: 807,207

[22] Filed: Feb. 28, 1997

[30] Foreign Application Priority Data

Feb. 29, 1996 [DE] Germany ........................ 196 07 630.7

[51] Int. Cl.[6] .................................................. F16L 33/20
[52] U.S. Cl. ......................... 285/256; 285/331; 285/259
[58] Field of Search .................................... 285/256, 258, 285/259, 331

[56] References Cited

U.S. PATENT DOCUMENTS

| | | | |
|---|---|---|---|
| 3,251,612 | 5/1966 | Webbe | 285/256 |
| 3,549,180 | 12/1970 | MacWilliam | 285/256 |
| 3,951,438 | 4/1976 | Scales | 285/256 |
| 4,083,584 | 4/1978 | Buzzi | 285/258 |
| 4,660,867 | 4/1987 | Kemper et al. | 285/256 |
| 5,040,830 | 8/1991 | Atkinson | 285/256 |

FOREIGN PATENT DOCUMENTS

| | | | |
|---|---|---|---|
| 4325349 | 7/1993 | Germany . | |
| 92/09840 | 11/1991 | WIPO . | |
| 94/29631 | 12/1994 | WIPO | 285/226 |

*Primary Examiner*—Eric K. Nicholson
*Attorney, Agent, or Firm*—Diller, Ramik & Wight, PC

[57] ABSTRACT

The press-fitting device for the connection of a tube, particularly a plastics tube or a plastics/metal/plastics compound tube, is provided with a connection body (12) comprising a substantially cylindrical connection portion (18) adapted for mounting thereon the end of the tube (39) to be connected. At least one deepened portion (20) formed in the connection portion (18) of the connection body (12). The annular sealing element (28) provided for sealing the connection body (12) with respect to the tube (39) in the connection portion (18), is made from a cross-linked polymeric material, the sealing element (28) extending over the at least one deepened portion (20). A pressing shell (42) is provided for radially pressing the tube end to the connection portion (18) of the connection body (12).

8 Claims, 1 Drawing Sheet

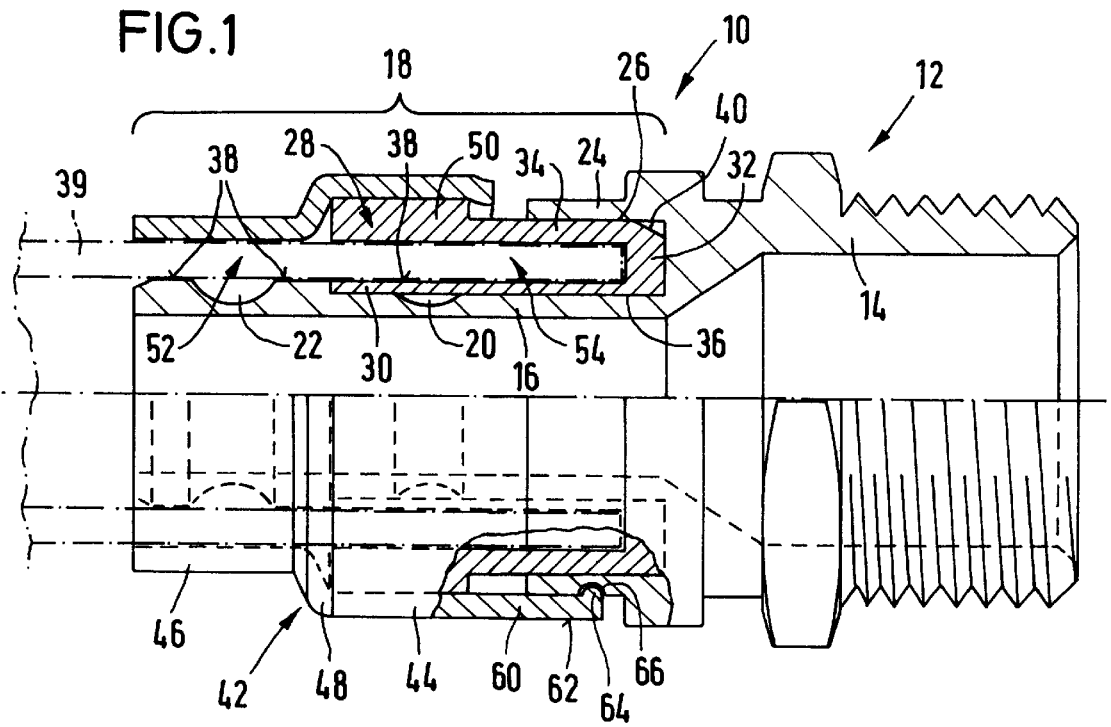
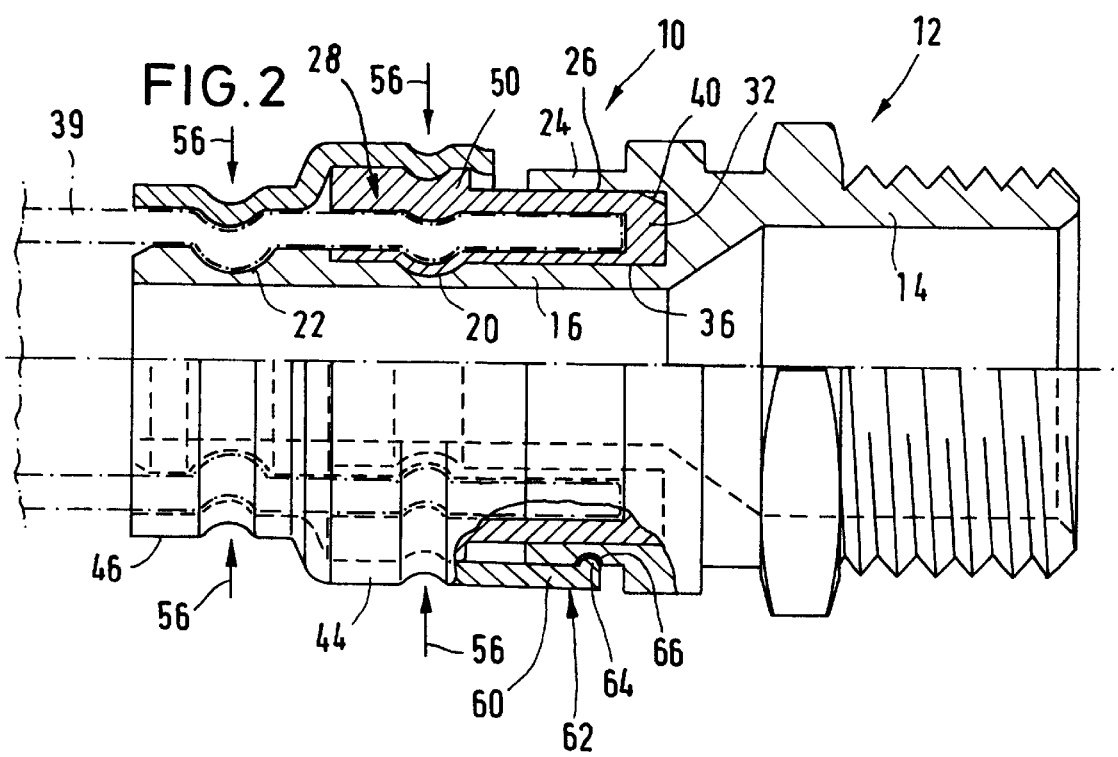

PRESS-FITTING DEVICE FOR CONNECTION OF A TUBE

FIELD OF THE INVENTION

The present invention relates to a press-fitting device for the connection of a tube, particularly of a plastics tube or a plastics/metal/plastics compound tube as generally known from WO 92/09840 and German Patent 43 25 349 A1.

Press-fitting devices of the above type are known in a large number of variants. In such press-fitting devices, the tube to be connected is mounted onto the substantially cylindrical connection portion of a connection body and, by means of a pressing shell, is radially applied against the connection portion of a connection body and is pressed tight. A profiled configuration of the connection portion or other measures are provided to prevent undesired detachment of the pressed tube from the connection body. For sealing the plastics or compound tube on the connection body, there is provided at least one O-ring of an elastic material which is accommodated in a receiving groove in the connection portion of the connection body. When mounting the tube end to be connected onto the connection portion of the connection body, it can happen ever again that the O-ring slides out of its receiving groove, entailing the risk of a non-sealing abutment of the pressed tube on the connection body. Further, a risk exists that the properties of the material of the O-ring will change to such an extent over time that leakage will be caused after a longer service life.

DISCLOSURE OF THE INVENTION

It is an object of the invention to provide a press-fitting device for connecting a plastics tube or a plastics/metal/plastics compound tube which allows for a tightly sealed abutment of the tube to the fitting device throughout the lifespan of the connection.

According to the instant invention, the above object is solved by a press-fitting device of the above type which comprises a connection body comprising a substantially cylindrical connection portion adapted for mounting thereon the end of a tube to be connected, at least one deepened portion formed in the connection portion of the connection body, an annular sealing element made from a cross-linked polymeric material for sealing the connection body with respect to the tube in the connection portion, the sealing element extending over said at least one deepened portion, and a pressing shell for pressing the tube end onto the connection portion of the connection body.

In the press-fitting device of the invention, the sealing of the tube with respect to the connection portion is accomplished by means of an annular sealing element made from a cross-linked polymeric material, particularly of a cross-linked polyethylene. To make it possible that the tube after pressing will be in tight abutment on the sealing element and that the sealing element, in turn, will be in tight abutment on the connection portion of the connection body, at least one deepened portion is arranged below the sealing element. When establishing the press connection, the material of the sealing element is pressed into said deepened portion, with the tube is being deformed correspondingly. The pressing of the sealing element into said deepened portion and the pressing of the tube into the deepened portion generated in the sealing element additionally provide for a traction relief and lend the tube an axial hold in the connection portion of the connection body, In addition to said at least one deepened portion having the sealing element extending thereover, at least one freely exposed deepened portion can be provided for directly pressing the tube into it when establishing the press connection. Preferably, the deepened portions are continuous deepened portions provided as grooves and the like. By way of alternative, also a plurality of deepened portions which are limited on all sides and are distributed along the periphery of the connection portion, can be provided.

The long-term behavior and the properties of plastics materials are widely known from the use of these materials for fluid-guiding tubes as used especially in heating systems and in sanitary installations. Presently, cross-linked polymeric materials have found widespread acceptance in the production of plastics tubes. Since the sealing element of the press-fitting device according to the invention is made from such a cross-linked polymeric material, it is known that the properties of the cross-linked polymeric material do not change throughout the range of applications of the press-fitting device, i.e. that these properties will remain the same. This constitutes a substantial step towards a long-term functional reliability of press connections between tubes of plastics or compound materials and (metallic) connection bodies.

According to a preferred embodiment of the invention, the annular sealing element is provided as a shell having a specific wall thickness. Said shell is preferably accommodated in a recess formed externally in the connection portion, such that the cylindrical outer side of the shell is flush with the remaining part of the connection portion. Thus, the depth of said recess is substantially identical with the wall thickness of the shell. Arranged within said recess is said at least one deepened portion into which material of the sealing element will be pressed when establishing the press connection.

Preferably, the annular sealing element is provided with an axially oriented annular space for receiving the tube end to be connected. Thus, the sealing element according to this embodiment will hold the to-be-connected tube end front inside, from outside and from the end side. In other words, the annular sealing element has a substantially U-shaped cross section and is provided with a cylindrical inner wall extending over said at least one deepened portion, a radial end wall extending at right angles to the inner wall, and a cylindrical outer wall arranged in parallel to the inner wall. The distance between the parallel concentric walls (inner wall and outer wall) of this sealing element is substantially identical with the wall thickness of the tube to be connected. Thus, during the press-on movement, material of the sealing element is pressed over the pressing shell from outside against the tube to be connected which in turn by its inner side presses material of the sealing element of the inner wall into said at least one deepened portion. The connection generated in this manner between the plastics tube/compound-material tube and the (metallic) connection body will be reliably tight after the pressing action with utmost likelihood. The abutment faces of the sealing element and the tube are of a labyrinthine configuration which still increases the sealing effect.

The above described sealing element is preferably arranged in a recess in the connection portion of the connection body, said recess having a depth substantially equal to the thickness of the inner wall of the sealing element. Said recess comprises also said at least one deepened portion having the sealing element extending thereover.

Preferably, the above sealing element is partially arranged in an annular space arranged between the connection portion and a collar located concentrically thereto and formed integrally with the connection body, which collar partially encloses the outer wall of the sealing element starting from the end wall of the sealing element, i.e. partially in the axial direction of the sealing element.

Further, the provision of an annular space in the sealing element for accommodating the tube to be connected makes it possible that the pressing shell in the non-pressed condition is secured against undesired detachment on the sealing element and thus on the press-fitting device. For this purpose, the pressing shell comprises two axial portions having different diameters. The axial portion having the larger diameter surrounds the outer wall of the sealing element having the pressing shell connected thereto by clamping or in some other manner. The axial portion having the smaller diameter follows said axial portion surrounding the sealing element, with the inner side of this axial portion of the pressing shell being substantially flush with the inner side of the outer wall of the sealing element. In other words, the difference between the diameters of the two axial portions is substantially equal to the thickness of the outer wall of the sealing element in that region in which the pressing shell surrounds the sealing element. Preferably, the outer wall of the sealing element in this region is thickened in comparison to the remaining part of the outer wall.

BRIEF DESCRIPTION OF THE DRAWINGS

An embodiment of the invention will be explained in greater detail hereunder with reference to the Figures.

FIG. 1 is a longitudinal view, half in section, of the press-fitting device with the sealing element and the pressing shell held thereon by clamping, in the condition prior to the pressing, with the end of the tube to be connected being shown in interrupted lines, and FIG. 2 is a longitudinal view, half in section, of the press-fitting device of FIG. 1 in the pressed condition, the end of the tube to be connected being likewise shown in interrupted lines.

DETAILED DESCRIPTION

In the half-sectional longitudinal views of FIGS. 1 and 2, a press-fitting device 10 is shown in its non-pressed condition and in its pressed condition. Said press-fitting device 10 comprises a metallic connection body 12 which in turn comprises a substantially cylindrical portion 14. Projecting coaxially from cylindrical portion 14 is a supporting shell 16 defining the connection portion 18 of connection body 12. Supporting shell 16 is of a cylindrical shape and comprises a first continuous deepened portion 20 and a second continuous deepened portion 22 which has a larger axial distance from the cylindrical portion 14 of connection body 12 than the first deepened portion 20. A collar 14, concentrically surrounding the supporting shell 16 but having a substantially smaller axial length than supporting shell 16, is integrally connected to the cylindrical portion 14 of connection body 12. The thus formed annular space 26 of connection body 12 between supporting shell 16 and collar 24 receives an annular sealing element 28 of cross-linked polyethylene (PEX). Said PEX sealing element 28 is of a U-shaped cross section and comprises a cylindrical inner wall 30 joined by a radial end wall 32. Radial end wall 32 is further connected to a cylindrical outer wall 34 of sealing element 28. Said two cylindrical walls form the legs, and the end wall forms the base of the above mentioned U-shape. Sealing element 28 is a one-pieced member.

The outer face of supporting shell 16 is formed with a recess 36 having the first deepened portion 20 arranged therein. The radial dimension (depth) of recess 36 is selected to be equal to the thickness of the inner wall 30 of sealing element 28. As shown in the Figures, the recess 36 in the connection portion 18 provides for a substantially cylindrical abutment face for abutment of tube 39 which is schematically shown at 38 in interrupted lines and is provided as a plastics tube or as a plastics/metal/plastics compound tube.

Due to its elasticity, the sealing element 28 whose inner diameter, as compared to the outer diameter of supporting shell 16 on its free end facing away from collar 24, is reduced by the depth of recess 36, can be fitted over said free end into recess 36. To facilitate this insertion process, sealing element 28 is beveled on the outer side of the transition region between the end wall 32 and the cylindrical outer wall 34, as shown at 40.

For pressing the tube 39 radially against supporting shell 16, use is made of a (metallic) pressing shell 42 comprising first and second axial portions 44 and 46 and a transition region 48 connecting said two portions. In its first axial portion 44, the pressing shell 42 encloses the outer wall 34 of sealing element 28, notably in the end portion of outer wall 34 facing away from end wall 32. The first axial portion 44 is larger than the diameter of the second axial portion 46 of pressing shell 42 by the thickness of the outer wall 34 in that region in which the latter is surrounded by pressing shell 42. As shown at 50 in the Figures, the free end portion of outer wall 34 facing away from end wall 32 and surrounded by the first axial portion 44 of pressing shell 42 has a larger thickness than in the remaining region. The first axial portion 44 of pressing shell 42 slightly projects beyond the end—facing towards collar 24 of connection body 12—of said thickened portion 50 of the outer wall 34 of sealing element 28 and in this region is provided with a constricted portion. In this manner, the pressing shell 42 is undetachably held on the sealing element 28 or is secured thereon against unintentional removal also in its non-pressed condition. Since the sealing element 28 itself is held undetachably on the connection body 12 because of its inner wall 30 arranged in the recess 36 of supporting shell 16, the pressing shell 42 and the connection body 12 form one unit (by means of sealing element 28).

As schematically shown in the Figures, the tube 39 to be connected is inserted into an annular space comprising a first partial space 52 and a second partial space 54. Said first partial space 52 is formed by the second axial portion 46 of pressing shell 42 and by the supporting shell 16; arranged in the region of first partial space 52 is the second deepened portion 22 of the connection portion 18 of connection body 12. Said second partial space 54 is formed by the annular space defined by the U-shape of sealing element 26. In the region of second partial space 54, the first deepened portion 20, having the inner wall 30 of sealing element 28 extending thereover, is arranged in the connection portion 18 of supporting shell 16.

The arrows 56 in FIG. 2 indicate the regions in which the annular pressing of pressing shell 42 is performed by a pressing tool (not shown). The regions of this annular pressing action are arranged to face the deepened portions 20 and 22. Thereby, the material of the inner wall 30 of sealing element 28 is pressed into the first deepened portion 20, and the material of tube 39 is pressed into the second deepened portion 22, The deformation of the inner wall 30 of sealing element 28 and tube 39, respectively, caused by the size and the configuration of the deepened portions 20 and 22, are continued in the pressing shell 42 and in the outer wall 34 of sealing element 28. It should be noted here that the deepened portions can also have shapes different from those illustrated here for providing the axial hold of the tube 39 on the connection body 12 in the pressed condition.

For securing the pressing shell 42 axially on the connection body 12 of the fitting 10, it can be provided, additionally or alternatively to the above described attachment of the pressing shell 42 on the sealing element 28, that the pressing shell 42 is locked directly to the connection body 12. For this purpose, the pressing shell 42 is lengthened (see reference numeral 60) to enclose the collar 24 from outside. In this overlapping region 62, the inner side of the pressing shell 42 (and/or the outer side of the collar 24) is formed with a projection 64 engaging a corresponding deepened portion 66 on the outer side of the collar 24 (and/or the inner side of the pressing shell 42). The projection(s) can be generated by pressing and be arranged in the corresponding deepened portion(s). The above mentioned mechanical locking is schematically shown in the lower parts of FIGS. 1 and 2.

I claim:

1. A press-fitting device for the connection thereto of a tube comprising:

a connection body (12) including a substantially cylindrical connection portion (18) adapted for mounting thereon the end of a tube (39), at least one deepened portion (20) formed in a supporting shell (16) of the connection portion (18) of the connection body (12), an annular sealing element (28) for sealing the supporting shell (16) of the connection body (12) with respect to the tube (39), the annular sealing element (28) extending over said at least one deepened portion (20), a pressing shell (42) for pressing an end of the tube (39) onto the supporting shell (16) of the connection portion (18) of the connection body (12), said annular sealing element (28) having a substantially U-shaped cross section defined by a cylindrical inner wall (30) extending over said at least one deepened portion (20), a radial end wall (32) and a cylindrical outer wall (34) substantially parallel to the inner wall (30), the distance between the inner wall (30) and the outer wall (34) being substantially identical to the wall thickness of the tube (39), and said sealing element (28) being adapted for insertion into a recess (36) in the connection portion (18) of the connection body (12), the depth of the recess (36) being substantially equal to the thickness of the wall of the shell and the thickness of the inner wall (30) of the sealing element (28), respectively.

2. The press-fitting device according to claim 1 wherein the connection body (12) includes a collar (24) arranged concentrically to the connection portion (18) and partially enclosing the outer wall (34) of the annular sealing element (28) starting from the end wall (32) of the sealing element (28).

3. The press-fitting device according to claim 1 wherein the pressing shell (42) comprises first and second axial portions (44, 46, respectively), the inner diameter of the first axial portion (44) being larger than that of the second axial portion (46) substantially by the wall thickness of the tube (39), and upon an end of the annular sealing element (28) partially facing away from the end wall (32), the first axial portion (44) of the pressing shell (42) encloses the outer wall (34) of the annular sealing element (28) to prevent undesired detachment.

4. The press-fitting device according to claim 3, wherein the outer wall (34) of the annular sealing element (28) in the region wherein the outer wall (34) is surrounded by the first axial portion (44) of the pressing shell (42), has a thickness enlarged by means of an outer projection (50).

5. The press-fitting device according to claim 1, wherein the annular sealing element (28) is made of polymeric material.

6. The press-fitting device according to claim 2, wherein the pressing shell (42) surrounds the collar (24) from outside, and means (64, 66) for locking the pressing shell (42) to the collar (24).

7. The press-fitting device according to claim 5 wherein the polymeric material of the annular sealing element (28) is polyethylene.

8. The press-fitting device according to claim 1 wherein said at least one deepened portion (20) is an outwardly opening peripheral groove formed in said supporting shell (16).

* * * * *